United States Patent [19]

Horn et al.

[11] Patent Number: 4,543,775

[45] Date of Patent: Oct. 1, 1985

[54] METHOD AND APPARATUS FOR PRUNING CORDON-TRAINED GRAPE VINES

[75] Inventors: Darrell C. Horn; Jeffery N. Fletcher, both of Fresno, Calif.

[73] Assignee: Up-Right, Inc., Berkeley, Calif.

[21] Appl. No.: 32,260

[22] Filed: Apr. 23, 1979

[51] Int. Cl.⁴ ............................................. A01D 55/18
[52] U.S. Cl. ...................................... 56/235; 56/330; 56/DIG. 2
[58] Field of Search ......................... 56/10.4, 233–237, 56/327 R, 328 R, 330, DIG. 2

[56] References Cited

U.S. PATENT DOCUMENTS

| | | | |
|---|---|---|---|
| 53,033 | 3/1866 | Oliner | 56/235 |
| 112,300 | 2/1871 | Van Nosdall | 56/235 |
| 2,798,354 | 7/1957 | O'Brien et al. | 56/235 |
| 2,926,480 | 3/1960 | Kimball | 56/235 |
| 3,115,739 | 12/1963 | Thoen et al. | 56/10.4 |
| 3,138,911 | 6/1964 | Pounds | 56/235 |
| 3,245,211 | 4/1966 | Weygandt et al. | 56/330 |
| 3,665,685 | 5/1972 | Allard | 56/10.4 |
| 3,667,200 | 6/1972 | Pool et al. | 56/10.4 |
| 3,913,304 | 10/1975 | Jodoin | 56/235 |

FOREIGN PATENT DOCUMENTS

| | | | |
|---|---|---|---|
| 1927793 | 12/1970 | Fed. Rep. of Germany | 56/10.4 |
| 2257223 | 8/1975 | France | 56/234 |
| 2270779 | 12/1975 | France | 56/235 |
| 13033 | of 1892 | United Kingdom | 56/236 |

Primary Examiner—Paul J. Hirsch
Attorney, Agent, or Firm—Phillips, Moore Lempio & Finley

[57] ABSTRACT

Cordon-trained grape vines are pruned by positioning circular saw blades to form a cutting path of predetermined size and shape above and on both sides of the horizontal trellis wire on which the cordons are trained and by translating the cutting path along the trellis wire while maintaining the size and shape of the cutting path substantially constant, while maintaining the sides of the cutting path centered on the cordons and maintaining the upper part of the cutting path at a desired height above the cordons.

22 Claims, 8 Drawing Figures

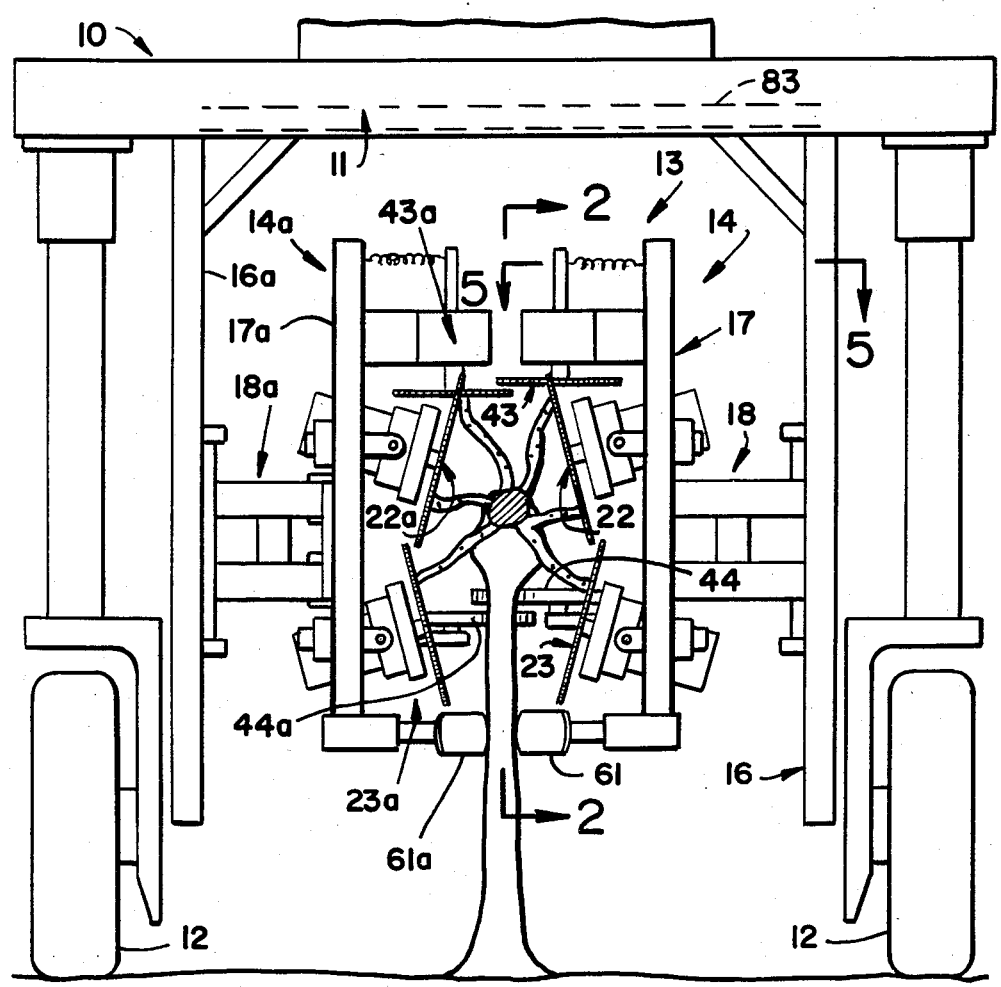
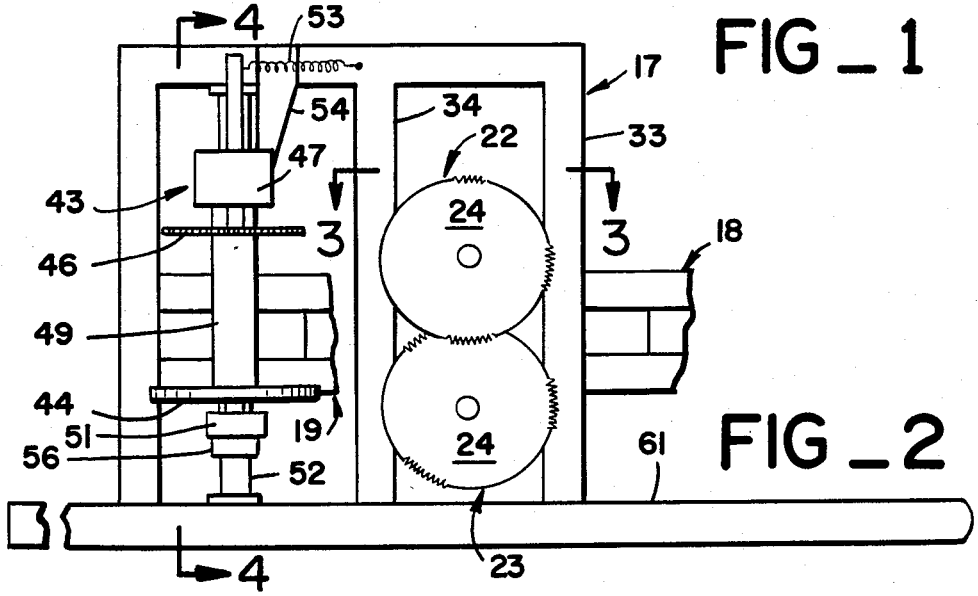

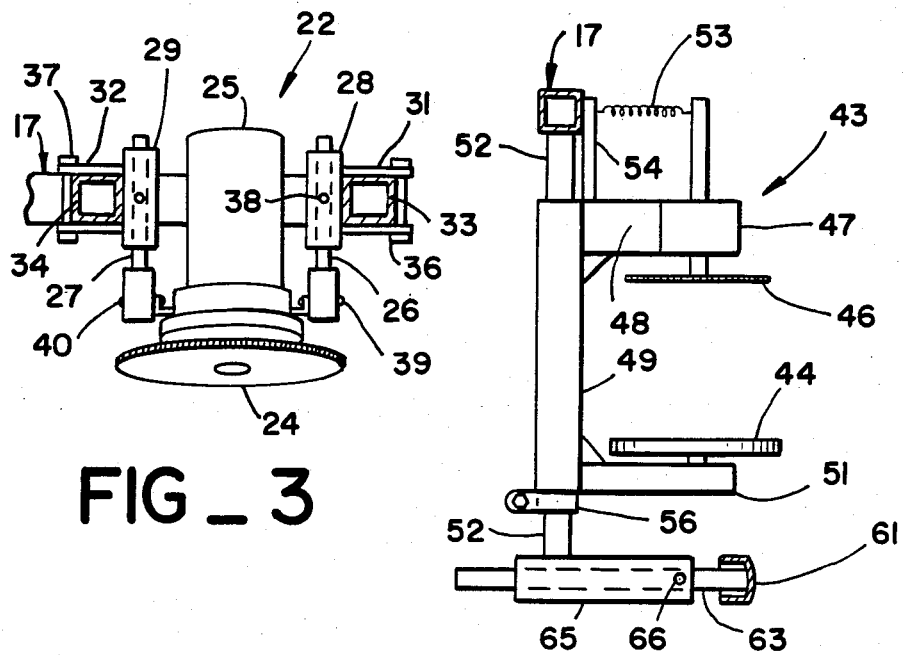
FIG_3
FIG_4
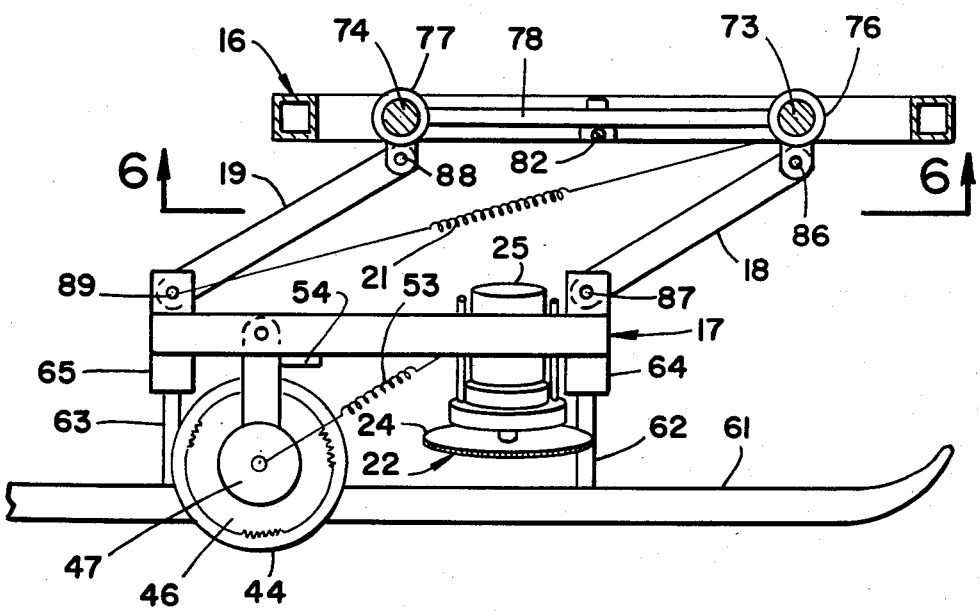
FIG_5

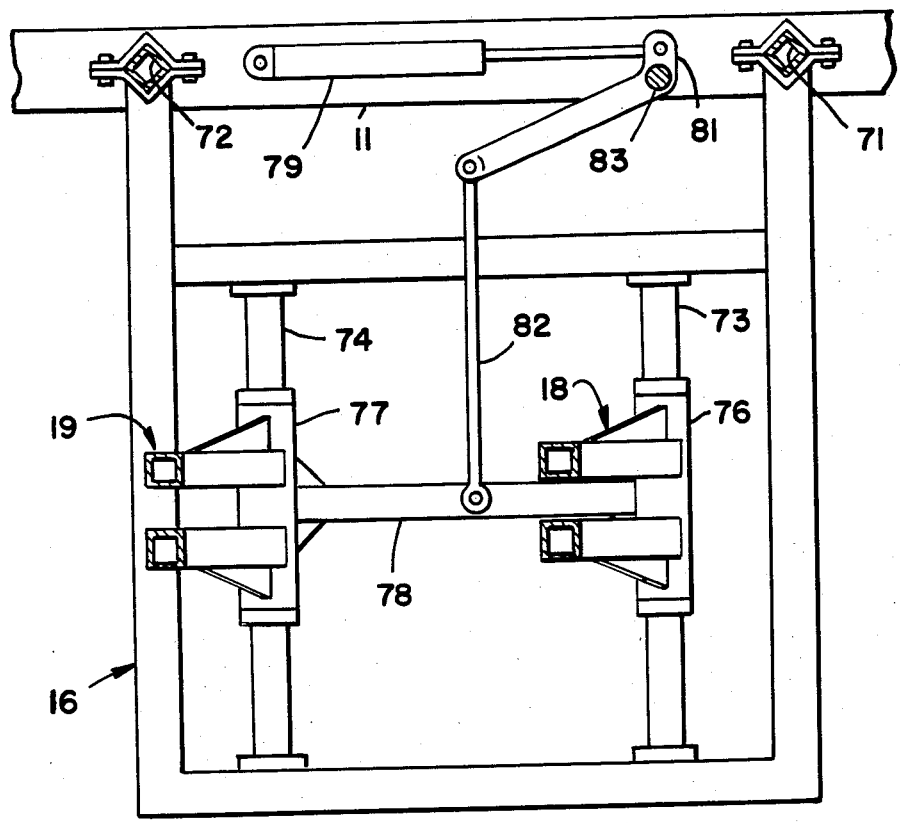
FIG_6
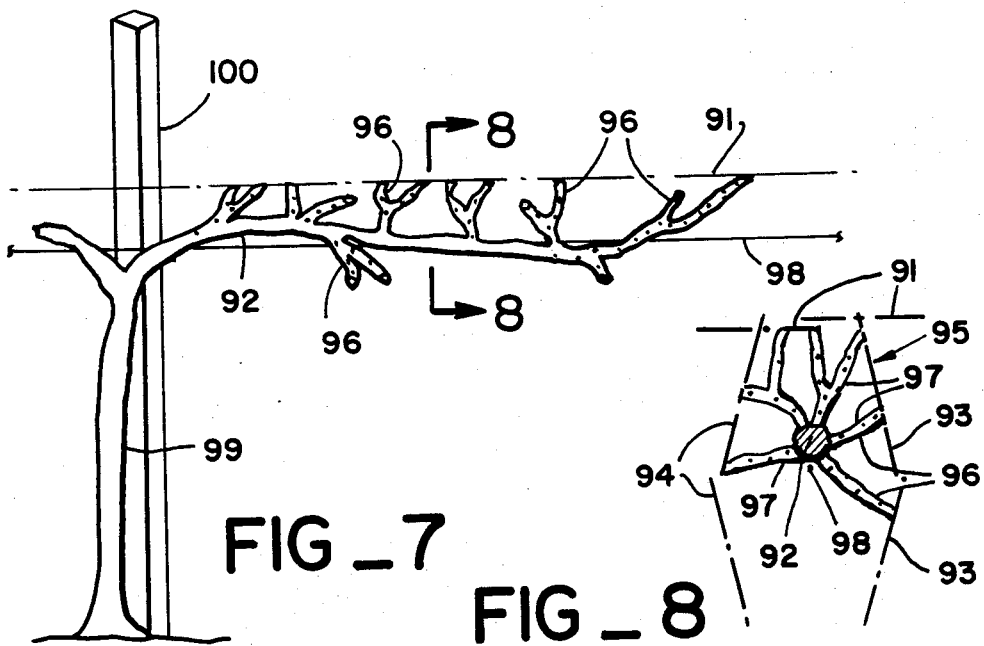
FIG_7   FIG_8

4,543,775

METHOD AND APPARATUS FOR PRUNING CORDON-TRAINED GRAPE VINES

BACKGROUND OF THE INVENTION

This invention relates to the pruning of cordon-trained grapevines and more particularly to a method and apparatus whereby such grapevines can be pruned mechanically.

A high percentage of grapevines throughout California and in some other parts of the world are trained to what is called a "bi-lateral cordon trellising system". This is a system where each vine along a row thereof is trained vertically up a stake, is then formed into a "Y", and each branch of the "Y" is trained along a horizontal trellis wire extending along the row. As the permanent branches, or cordon, matures, they form two long permanent arms of the vine in line with and along the trellis wire and at approximately equal distances from the ground throughout their length. Protruding from the bi-lateral cordon along its lengths are permanent spurs which are formed as the vine grows each year. These spurs of annual growth are cut back at pruning time to a particular length which is determined by the number of buds desired per spur. During the next growing season, the growth of the vine comes from each of these buds. At pruning time the following year, the growth from each bud is cut back again to result in a given number of buds per spur. As the vines grows and is pruned from year to year, these spurs become branches which progress further and further from the trellis wire or from the cordon attached thereon.

It has long been recognized that the vines should be pruned each year so that a controlled growth results in the next growing season to provide a desired balance between the amount of foliage growth and the amount of fruit grown on the vine. If the pruning leaves too many buds on the vine spurs, there will be an excessive number of bunches of grapes formed and the vine will put a relatively great amount of its energy into producing the fruit crop and a relatively small amount of its energy will be put into producing the vine growth and foliage. Since each leaf of the foliage is a nutrient factory supplying energy from the sun to the plant, too little foliage will result in the vine having insufficient energy to produce the excessive fruit crop. As a consequence the crop will have a low sugar content and poor quality.

On the other hand, if too few buds are left, too great an amount of energy of the plant will go into producing foliage. The fruit crop will have high sugar content and high quality but the crop amount will be small.

As is apparent, the conditions which is desired is one in which the foliage and crop growth is balanced to provide a maximum harvest of high quality grapes. The proper balance has always been controlled by pruning the spurs to leave a proper number of buds, the number of buds varying somewhat in accordance with the particular variety of grapes being grown.

The authoritative educators within the wine industry and the commercial viticulturalists have long contended that having a specific number of buds per spur throughout the length of the cordon is essential for quality, crop quantity and foliage balance. The practice then has been to prune the vines to leave a predetermined number of spurs per cordon and a predetermined number of buds per spur. Because of the way a vine grows in nature, the spurs have a relatively random growth pattern and there are different, and random, distances between adjacent buds on the spurs. As a consequence, pruning of the spurs to have an equal number of buds on each spur will result in spurs to considerably different lengths. The traditional pruning method, therefore, can only be accomplished by hand with the buds on each spur being counted so that the spur will be pruned to the desired length. As is apparent, traditional pruning is tedious and time consuming.

SUMMARY OF THE INVENTION

We have discovered that having the same number of buds on each spur is not as important as hitherto thought. Instead, we have discovered that what is important to result in a balance of crop quality, crop quantity and vine foliage is to have a predetermined number of buds per vine and that it does not make any significant difference if the spurs have differing numbers of buds thereon. As a result, proper balance for efficient commercial production of grapes can be achieved by cutting the spurs at a given distance from the cordon supporting wire, regardless of how many buds per spur may result, as long as the distance is selected to leave the desired total number of buds per vine. Tests that we have conducted in California vineyards confirms this to be correct.

Since all vines in most vineyards will have been planted at the same time, the age of the plants will be the same and the average growth of the randomly oriented spurs will be substantially the same for all of the vines in the vineyard. As a consequence, once the distance from the cordon supporting wire, for proper cutting, has been determined for one vine, the same distance of cutting can be used for all of the other plants.

Our discovery of this method of pruning cordon trained grape vines has a very significant result in that it enables vineyards to be pruned mechanically by a machine which proceeds down a row, at a fairly rapid pace, cutting the spurs at the same distance from the supported cordons. Such prunning can be accomplished at a very substantial savings as compared to the costs involved in the present hand pruning that is necessary to give the same number of buds per spur.

The method of the present invention then is one in which the spurs along the length of a cordon trained grapevine are cut at a predetermined distance from the cordon.

The apparatus of the present invention comprises a wheeled vehicle adapted to straddle and move along a row of cordon trained grapevines, the vehicle having cutting elements above and on both sides of the cordon to form a cutting path of predetermined and substantially constant shape above and on both sides of the cordon as the machine moves down the row.

BRIEF DESCRIPTION OF THE DRAWINGS

In the drawings, forming a part of this application, and in which like parts are designated by like reference numerals throughout the same;

FIG. 1 is a front elevational view of a vineyard machine equipped with vine pruning apparatus in accordance with the present invention;

FIG. 2 is an elevational view of one of the swing frames of the pruning apparatus of FIG. 1, taken on line 2—2 thereof;

FIG. 3 is a sectional detail in plan, taken on line 3—3 of FIG. 2;

FIG. 4 is a sectional detail view, in elevation, taken on line 4—4 of FIG. 2;

FIG. 5 is a sectional view, in plan, of the swing and support frames of the pruning apparatus of FIG. 1, taken on line 5—5 thereof;

FIG. 6 is a sectional view, in elevation, of the support frame, taken on line 6—6 of FIG. 5;

FIG. 7 is an illustrative view, in elevation, of a cordon-trained vine, pruned in accordance with the present invention;

FIG. 8 is a sectional view, in elevation, of the vine of FIG. 7, and taken on line 7—7 thereof.

DESCRIPTION OF THE PREFERRED EMBODIMENT

Referring now to the drawings, FIGS. 1–6 illustrate a vineyard machine 10 equipped for the mechanized pruning of grape vines, machine 10 having an inverted, U-shaped, chassis 11 and ground engaging wheels 12 at each corner thereof, the machine being thus adapted to straddle and move along a row of grape vines. Preferably machine 10 is a typical grape-harvesting machine with the picking heads (not shown) removed therefrom and the pruning apparatus 13 mounted thereon in place thereof.

Pruning apparatus 13 comprises first and second pruning units 14 and 14a, mounted on opposite sides of the longitudinal centerline of the machine 10. The two units are mirror images of each other and only unit 14 will be described in detail. Corresponding elements of unit 14a are identified by like reference numerals with the letter "a" appended thereto.

Pruning unit 14 comprises a support frame 16, fixed to and depending from the machine chassis 11, and a vertical, swing, or cutter, frame 17 supported by a pair of swing arms 18 and 19 from support frame 16 so that the swing frame can move horizontally towards and away from the longitudinal centerline of the machine. Spring 21 (FIG. 3) is connected between the support and swing frames 16 to bias the swing frame towards the longitudinal centerline of the machine.

Upper and lower vertically-spaced and overlapping side-cutters 22 and 23 are mounted on the swing frame 17 towards the front thereof. Preferably the side cutters each comprise a rotary saw blade 24 driven by a hydraulic motor 25. As best seen in FIG. 3, motor 25 is supported on horizontal shafts 26 and 27 which pass through sleeves 28 and 29. Sleeves 28 and 29 each have a clamp, 31 and 32 respectively, fixed thereto so that the sleeves can be rigidly fixed to vertical columns 33 and 34 of the swing frame 17 by means of bolts 36 and 37 and at a desired height thereon. The saw blade can be moved towards or away from the swing frame by virtue of axial sliding movement of shafts 26 and 27 in sleeves 28 and 29, with the desired position being fixed by pins 38. Shafts 26 and 27 may each be connected by bolts 39 and 40 to motor 25, thus allowing the saw blade 24 to be tilted to a desired angle from vertical and to be then fixed at such angle by a tightening of the bolts.

A top cutter 43 and post sensor 44 are also mounted on swing frame 17 rearwardly of the side cutters 22 and 23. As best seen in FIG. 4, top cutter 43, preferably having a horizontal rotary saw blade 46 driven by a hydraulic motor 47, is mounted on upper horizontal arm 48 which is fixed to and extends outwardly from sleeve 49. The post sensor 44, preferably a horizontal, freely-rotatable disk, the outer edge of which forms an arcuate guide is mounted on lower horizontal arm 51 which is also fixed to, and extends outwardly from sleeve 49. Disk 44 is in axial alignment with saw blade 46 and has a radius larger than that of saw blade 46 so that the arcuate guide extends horizontally beyond the cutting edge of the saw blade. Sleeve 49 is mounted on column 52 of swing frame 17 for free rotation about the vertical axis of column 52, so that the top cutter and post sensor can move as a unit towards and away from the longitudinal centerline of the machine. Spring 53 is connected between the upper arm 48 and the swing frame 17 to bias the top cutter 43 and post sensor 44 towards the machine centerline, with such movement thereof being limited by engagement of the upper arm 48 with stop member 54 which is fixed to the swing frame. Clamp 56 is fixed to column 52 to support sleeve 49 at a desired height relative to swing frame 17. The top cutters are adjusted so that their saws are slightly vertically spaced from each other and so that they overlap when at the machine centerline.

If desired, post sensor 44 could be positioned vertically above and in axial alignment with the top cutter 43, to sense the upper end of a post and guide the top cutter 43 therepast.

Swing frame 17 also carries therewith an elongated guide ski 61 which extends parallel to the horizontal centerline of the machine and preferably has a length greater than the spacing between vine trunks so that there will be at least one vine trunk between the skis 61 and 61a at all times as the machine travels down a row of vines. The transversely extending ski support shafts 62 and 63 extend through sleeves 64 and 65 at the lower front and rear ends of the support frame to permit the distance of the ski from the swing frame to be adjusted as desired, with such distance then being fixed, as by pins 66.

As best seen in FIG. 6, support frame 16 is fixed at its upper end to cross beams 71 and 72 of the main machine frame 11 and includes vertical columns 73 and 74. Sleeves 76 and 77, interconnected by tie plate 78, are disposed on columns 73 and 74, respectively, for unitary vertical movement relative to support frame 16, as by the extension and retraction of hydraulic cylinder 79 which causes bell crank 81 to pivot so that connecting rod 82 will raise or lower tie plate 78. Shaft 83 is rotatably journaled on the main frame 11 and extends crosswise thereof thereto. Pivotal movement of the bell crank will thus cause shaft 83 to rotate and produce a corresponding movement of a corresponding bell crank and connecting rod of the pruning unit 14a. As a consequence, hydraulic cylinder 79 will produce unitary and vertical movement of the swing arms relative to the support frames 16 and 16a.

As best seen in FIGS. 2, 5, and 6, swing arm 18 is pivotally connected at one end 86 to sleeve 76 of support frame 16 and at its other end 87 to the front end of swing frame 17. Similarly, swing arm 19 is pivotally connected at 88 and 89 to sleeve 77 and the rear end of swing frame 17.

The parallel linkage provided by swing arms 18 and 19 will thus allow swing frame 17 to pivot away from the longitudinal centerline off the machine (and against the bias of spring 21) or back towards such centerline. Actuation of hydraulic cylinder 79 enables the height of swing frame 17 to be varied relative to support frame 16 and thus relative to the main machine frame 11.

Operation

The pruning apparatus 13 is first adjusted for use in a particular vineyard by positioning the various saws on the swing, or cutter, frames 14 and 14a so that the saws will be spaced from the vine cordons to cut the spurs thereof at the proper distance from the cordons which will result in leaving the desired number of buds per vine. As brought out previously, the blades of the top saws 43 and 43a can be vertically adjusted relative to the swing frames and the blades of the side saws 22,22a, 23 and 23a can be adjustably tilted and can be adjusted vertically and horizontally relative to the swing frames.

With the saws thus adjusted, they will form a cutter means having a first portion (i.e. cutters 43 and 43a) which has a cutting path 91 (FIG. 8) above the cordon 92 and extending outwardly from both sides of the longitudinal centerline of the machine, a second portion (i.e. cutters 22 and 23) which has a cutting path 93 extending downwardly from cutting path 91 on one side of the longitudinal centerline and a third portion (i.e. cutters 22a and 23a) which has a cutting path 94 extending downwardly from the cutting path 91 on the other side of the longitudinal centerline. Although the top cutter saws are spaced rearwardly of the side cutter saws, the cutting paths 91,93 and 94 will form a single and substantially continuous cutting path 95, when viewed in the direction of the longitudinal centerline of the machine.

With the saws adjusted as shown in FIG. 8, the spurs growing downwardly will be pruned to the same length as those growing upwardly from the cordons. However, with the growing use of pulsator type picking mechanisms, there is a trend among vineyard managers to cut the spurs on the lower portion of the cordon shorter than those on the top or upper sides. With the present apparatus it is quite simple to position the saws to form a cutting path that will accomplish such pruning, since this can be done by positioning the lower side saws at a substantially greater angle from vertical than the upper side saws.

As previously mentioned, the size and configuration of the cutting path 95 will depend upon the age and particular variety of the grape vines in the vineyard, and such cutting path is chosen so that the total of the pruned spurs 96 of a vine will have a total number of buds 97 thereon substantially equal to the desired number of buds per vine.

The driver then moves the machine to straddle the end of a vine row. A second workman, positioned at the rear of the machine, actuates hydraulic cyliner 79 to move the swing frames 14 and 14a vertically so that the cutting path 95 is precisely positioned relative to the cordons 92 trained along the horizontal trellis wire 98. The machine is then propelled down the row of vines to prune the spurs 96 thereof. The circular saw blades will give a very clear cut of the spurs with a minimal amount of damage thereto and comparable to that of hand-held pruning shears. The guide skis 61 and 61a will slidingly embrace the vine trunks 99 and will maintain the spring-biased swing frames 14 and 14a centered on the vines so that the circular cutting saws are held at a very precise distance from the cordons even though the vehicle driver may drive the machine off-center relative to the vine row. If a cordon droops, because of a loose trellis or poor training, the second workman will actuate hydraulic cylinder 79 to maintain the cutting path 95 precisely positioned vertically relative to the cordon.

As the pruning units 14 and 14a of the pass by a post 100, 8, post sensor guide disks 44 and 44a will engage the post 98 and will be swung rearwardly relative to the swing frames by such engagement. Such movement will thereby swing the smaller diameter top saws 43 and 43a rearwardly, thereby opening the cutter path 91 above the trellis wire so that the post can pass through such opening and not be cut by the top saws. As soon as the post sensor disks pass the post, spring 53 will pull the top saws back to their overlapped position above the cordon so that top cutting can continue. With the use of the circular post sensor disks 44 and 44a the cutting path 91 will only be opened just enough to allow the post to pass therethrough and virtually no spurs will be left uncut by the top saws.

The automatic centering, easy height adjustment of the swing frames and use of rotary saws enable the vine spurs to be clearly cut with such precision that little or no hand labor is required after the machine has pruned the vineyard.

By use of a machine as described herein substantial cost savings in vineyard pruning can be achieved. For example, a typical vineyard has about 540 vines per acre. When hand pruned in a conventional manner, with between 10 to 17 spurs left on each vine and with the desired number of buds per spur being some given number, typically a number between 2 and 5 depending upon the desires of the vineyard manager, it will take between 2 and 3 minutes to hand prune one vine, or about 22 hours per acre. At a labor cost of $3.00 an hour, it will cost about $66.00 per acre for hand pruning.

By contrast, the mechanical pruner as described herein can operate at a ground speed of about 2 miles per hour and can prune about 2.7 acres per hour. The machine costs and operating and labor costs are about $20.00 an hour, or, approximately $7.50 an acre.

For a typical 10-hour day, 27 acres can be machine pruned for a cost of $200.00. If the same acreage were to be hand pruned, the cost would be over $1750.00.

We claim:

1. The method of spur-pruning a cordon-trained grape vine in which the cordons extending from a vine trunk are trained along a horizontal trellis wire, comprising cutting the spurs along the length of the cordon and at a predetermined and substantially constant distance away from the trellis wire to leave a total number of buds on the pruned spurs of said vine which is substantially equal to a predetermined number.

2. The method of spur-pruning a row of cordon-trained grape vines in which the trunks of the vines are spaced along said row and adjacent to vertical posts and the cordons of the vines are trained along a horizontal trellis wire supported by said vertical posts, the method comprising:

positioning cutter elements in spaced relation to each other and in spaced relation to the cordon of one of said vines to form a cutting path above and on both sides of said cordon, said cutting path being substantially continuous and of predetermined configuration as seen looking down the length of said trellis wire, translating said cutter elements along the length of the cordons trained on said trellis wire while substantially maintaining the predetermined configuration of said cutting path, cutting the spurs of said cordons when and where engaged by said cutter elements, said configuration of said cutting path being such as to leave a total number of buds on the pruned spurs of a vine which is substantially equal to a predetermined number.

3. The method as set forth in claim 2, and further including:
sensing the presence of a post as the cutter elements are translated therepast,
opening the cutting path above the trellis wire in response to a sensing of the presence of said post,
moving the cutter elements past said post with said post passing through the opening of the cutting path,
closing the cutting path above the trellis wire after the cutter elements have passed by said post.

4. The method as set forth in claim 2 and further including:
maintaining the sides of said cutting path centered on the cordons trained on said trellis wire as the cutter elements are translated therealong,
maintaining the top of said cutting path at a constant height above the cordons as the cutter elements are translated along said cordons.

5. The method as set forth in claim 2 and further including:
engaging posts and vine trunks below said cutting path as the cutter elements are translated along the length of the vine cordons, and maintaining the sides of said cutting path at a predetermined outward distance from said posts and vine trunks in response to such engagement.

6. The method as set forth in claim 5 and further including:
sensing the presence of a post as the cutter elements are translated therepast,
opening the cutting path above the trellis wire in response to a sensing of the presence of said post,
moving the cutter elements past said post with said post passing through the opening of the cutting path,
closing the cutting path above the trellis wire after the cutter elements have passed by said post.

7. The method of spur-pruning a row of cordon-trained grape vines in which the trunks of the vines are spaced along said row and adjacent to vertical posts and the cordons of the vines are trained along a horizontal trellis wire supported by said vertical posts, the method comprising:
positioning six rotary saw blades, in spaced and fixed relation to each other and in spaced relation to the cordon of one of said vines, with two upper saw blades above and two saw blades on each side of said cordon to form a cutting path above and on both sides of said cordon, said cutting path being substantially continuous and of predetermined configuration as seen looking down the length of said trellis wire,
moving said saw blades along the length of the cordons trained on said trellis while substantially maintaining the predetermined configuration of said cutting path,
cutting the spurs of said cordons when and where engaged by said saw blades,
said configuration of said cutting path being such as to leave a total number of buds on the pruned spurs of a vine which is substantially equal to a predetermined number.

8. The method as set forth in claim 7 and further including:
moving the six saw blades in unison and vertically to maintain the upper saw blades at a substantially constant height above the cordons.

9. The method as set forth in claim 7 and further including:
sensing the presence of a post as said saw blades are moved therepast,
moving the two upper saw blades horizontally apart from each other,
moving the two upper saw blades past said post,
moving the two upper saw blades horizontally back towards each other after passing said post.

10. The method as set forth in claim 9 further including:
maintaining a substantially constant spaced relation between the four other saw blades during horizontal movement of said upper saw blades away from and back towards each other as a post is passed.

11. The method as set forth in claim 7 and further including:
engaging posts and vine trunks at a level below said cutting path as said saw blades are moved along said row and maintaining the two saw blades on each side of said cordon at a predetermined outward distance from said posts and vine trunks in response to such engagement.

12. The method as set forth in claim 11 and further including:
sensing the presence of a post as said saw blades are moved therepast,
moving the two upper saw blades horizontally apart from each other in response to such sensing,
moving the two upper saw blades past said post and then horizontally back towards each other after passing said post.

13. Apparatus for spur-pruning a row of cordon-trained grape vines in which the trunks of the vines are spaced apart along said row and the cordons of the vines are trained along a horizontal trellis wire extending the length of the row, said apparatus comprising:
a wheeled chassis adapted to straddle and move along said row of cordon-trained vines with the longitudinal centerline of said chassis being lengthwise of said row,
first and second support frames fixed to said chassis on opposite sides of said longitudinal centerline,
first and second cutter frames disposed between said support frames and on opposite sides of said longitudinal centerline,
first mounting means mounting said first cutter frame on said first support frame for movement of said first cutter frame towards and away from said longitudinal centerline and at a fixed level relative to said first mounting means,
second mounting means mounting said second cutter frame on said second support frame for movement of said second cutter frame towards and away from said longitudinal centerline and at a fixed level relative to said second mounting means,
means for resiliently biasing each of said first and second cutter frames towards said longitudinal centerline,
first and second opposed and elongated guide skis fixed to said first and second cutter frames, respectively, in parallelism with said longitudinal centerline, cutter means mounted on said first and second cutter frames above said guide skis, said cutter means having a first cutter portion with first and second cutter elements mounted on said first and second cutter frames respectively at fixed elevation thereon for cutting spurs of said cordon-trained grape vines along a cutting path extending outwardly from both sides of said longitudinal centerline, said cutter means having a second cutter portion mounted on said first cutter frame for cutting said spurs along a cutting path extending downwardly from the path of said first cutter portion on the side of said longitudinal centerline towards said first support frame, said cutter means having a third cutter portion mounted on said second cutter frame for cutting said spurs along a cutting path extending downwardly from the path of said first cutter portion on the side of said longitudinal centerline towards said second support frame.

14. Apparatus as set forth in claim 13 and further including:
means for unitarily and vertically moving said first and second mounting means relative to said first and second support frames.

15. Apparatus as set forth in claim 13 wherein the length of said guide skis is greater than the spacing between said vine trunks.

16. Apparatus as set forth in claim 13, and further including:
first and second post sensors spaced vertically from said first and second cutting elements, respectively, and extending from said first and second cutter frames, respectively, to said longitudinal centerline,
means mounting said first post sensor and said first cutter element on said first cutter frame for unitary horizontal movement of said first post sensors and said first cutter element relative to said first cutter frame and towards and away from said longitudinal centerline,
means mounting said second post sensor and said second cutter element on said second cutter frame for unitary horizontal movement of said second post sensor and said second cutter element relative to said second cutter frame and towards and away from said longitudinal centerline,
means for resiliently biasing said first and second cutter elements towards said longitudinal centerline.

17. Apparatus as set forth in claim 16 and further including:
means for unitarily and vertically moving said first and second mounting means relative to said first and second support frames.

18. Apparatus as set forth in claim 17 wherein the length of said guide skis is greater than the spacing between said vine trunks.

19. Apparatus as set forth in claim 16 wherein said first and second cutter elements each comprise a horizontally-disposed circular saw blade and wherein said saw blades are vertically spaced from each other and are mounted on said first and second cutter frames to overlap each other when biased to the longitudinal centerline of said machine.

20. Apparatus as set forth in claim 19,
wherein said second and third portions of said cutter means each comprise a pair of vertically spaced and partially overlapping circular saw blades, and wherein the upper saw blade of each pair extends upwardly to at least the height of the saw blades of said first portion of said cutter means.

21. Apparatus as set forth in claim 20 and further including:
means for unitarily and vertically moving said first and second mounting means relative to said first and second support frames.

22. Apparatus as set forth in claim 21 wherein the length of said guide skis is greater than the spacing between said vine trunks.

* * * * *